(12) United States Patent
Schäffner et al.

(10) Patent No.: US 10,060,318 B2
(45) Date of Patent: Aug. 28, 2018

(54) METHOD FOR OPERATING A DRIVING SYSTEM AND CORRESPONDING DRIVING SYSTEM

(71) Applicant: MTU Friedrichshafen GmbH, Friedrichshafen (DE)

(72) Inventors: Guido Schäffner, Horgenzell (DE); Andrea Prospero, Langenargen (DE); Günter Zitzler, Opfenbach (DE); Tim Späder, Langenargen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 14/893,313

(22) PCT Filed: Apr. 16, 2014

(86) PCT No.: PCT/EP2014/001024
§ 371 (c)(1),
(2) Date: Nov. 23, 2015

(87) PCT Pub. No.: WO2014/187521
PCT Pub. Date: Nov. 27, 2014

(65) Prior Publication Data
US 2016/0123205 A1 May 5, 2016

(30) Foreign Application Priority Data
May 22, 2013 (DE) .......... 10 2013 209 481

(51) Int. Cl.
*F01N 3/00* (2006.01)
*F01N 3/10* (2006.01)
(Continued)

(52) U.S. Cl.
CPC ......... *F01N 3/2066* (2013.01); *F01N 3/0231* (2013.01); *F01N 3/103* (2013.01);
(Continued)

(58) Field of Classification Search
CPC .... F01N 11/00; F01N 11/002; F01N 2550/02; F01N 2900/0416; F01N 2900/1402;
(Continued)

(56) References Cited

U.S. PATENT DOCUMENTS 8,720,189 B2 5/2014 Ren et al.
9,038,370 B2 5/2015 Massner
(Continued)

FOREIGN PATENT DOCUMENTS

DE 102008049098 A1 6/2009
DE 10 2008005640 * 7/2009
(Continued)

OTHER PUBLICATIONS

DE 10 2008005640 (translation), Lahr et al, Jul. 2009, abstract (2 pages).*
(Continued)

*Primary Examiner* — Phutthiwat Wongwian
*Assistant Examiner* — Diem Tran
(74) *Attorney, Agent, or Firm* — Lucas & Mercanti, LLP; Klaus P. Stoffel

(57) ABSTRACT

A method for operating a driving system having an internal combustion engine and an exhaust gas purifying device through which exhaust gas from the internal combustion engine flows in order to be purified. The exhaust gas purifying device has at least one catalyst element for catalytic conversion of nitrogen monoxide into nitrogen dioxide at a determined conversion rate. In order to compensate for an age related decrease in the conversion rate of the catalyst element the nitrogen monoxide emission from the internal combustion engine and/or the exhaust gas temperature before the catalyst element are adjusted as a function of the current conversion rate and/or the age of the catalyst element so that the nitrogen dioxide concentration after the catalyst (Continued)

element is greater than or equal to a minimum concentration and/or that the molar ratio between nitrogen monoxide and nitrogen dioxide after the catalyst element corresponds to a predetermined ratio.

11 Claims, 1 Drawing Sheet

(51) Int. Cl.
    *F01N 3/02*     (2006.01)
    *F01N 3/20*     (2006.01)
    *F01N 11/00*     (2006.01)
    *F01N 3/023*     (2006.01)
    *F02D 41/02*     (2006.01)

(52) U.S. Cl.
    CPC .............. *F01N 3/106* (2013.01); *F01N 11/00* (2013.01); *F01N 11/002* (2013.01); *F02D 41/0235* (2013.01); *F01N 2550/02* (2013.01); *F01N 2900/0416* (2013.01); *F01N 2900/1402* (2013.01); *F01N 2900/1404* (2013.01); *F01N 2900/1621* (2013.01); *Y02T 10/47* (2013.01)

(58) Field of Classification Search
    CPC ..... F01N 2900/1404; F01N 2900/1621; F01N 3/0231; F01N 3/103; F01N 3/106; F01N 3/2066; F02D 41/0235; Y02T 10/47
    USPC .......................................... 60/276, 277, 301
    See application file for complete search history.

(56) References Cited

U.S. PATENT DOCUMENTS

| | | |
|---|---|---|
| 2010/0154386 A1 | 6/2010 | Perrin et al. |
| 2012/0227383 A1 | 9/2012 | Charial |
| 2013/0074477 A1 | 3/2013 | Kim et al. |

FOREIGN PATENT DOCUMENTS

| | | |
|---|---|---|
| DE | 102012001251 A1 | 7/2012 |
| DE | 102011055166 A1 | 5/2013 |
| WO | 2009135063 A2 | 11/2009 |

OTHER PUBLICATIONS

DE 10 2008005640 (translation), Lahr et al, Jul. 2009, description (14 pages).*

* cited by examiner

METHOD FOR OPERATING A DRIVING SYSTEM AND CORRESPONDING DRIVING SYSTEM

The present application is a 371 of International application PCT/EP2014/001024, filed Apr. 16, 2014, which claims priority of DE 10 2013 209 481.7, filed May 22, 2013, the priority of these applications is hereby claimed and these applications are incorporated herein by reference.

BACKGROUND OF THE INVENTION

The invention pertains to a method for operating a driving system with an internal combustion engine and an exhaust gas purifying device, through which the exhaust gas of the internal combustion engine flows to be purified, wherein the exhaust gas purifying device comprises at least one catalyst element for the catalytic conversion of nitrogen monoxide to nitrogen dioxide at a determined conversion rate. The invention also pertains to a driving system.

The driving system serves, for example, to drive a motor vehicle or a watercraft. For this purpose, a torque is provided by the internal combustion engine, which is configured as, for example, a diesel engine. The exhaust gas produced by the internal combustion engine is sent to the exhaust gas purifying device, where it is least partially freed of pollutants. It is frequently advantageous for the exhaust gas flowing through the exhaust gas purifying device to comprise a certain percentage of nitrogen dioxide, so that it can be used, for example, to regenerate a particle filter and/or to react with nitrogen monoxide in a catalyst.

Only a small quantity of nitrogen dioxide or possibly none at all, however, is present in the exhaust gas immediately downstream from the internal combustion engine. In contrast, the amount of the nitrogen monoxide in the exhaust gas is comparatively large. It is for this reason that the at least one catalyst element is provided in the exhaust gas purifying device. This catalyst element serves to convert nitrogen monoxide catalytically to nitrogen dioxide, wherein this takes place at the determined conversion rate. Downstream from the catalyst element, i.e., downstream relative to the main flow direction of the exhaust gas, a higher percentage of nitrogen dioxide and/or a larger quantity of it is therefore present in the exhaust gas of the internal combustion engine than is present upstream of the catalyst element. The catalyst element comprises at least one catalytically active component or catalyst material such as platinum or a platinum alloy. As the service life of the catalyst element increases, however, the catalytic effect of this catalyst material and therefore of the catalyst element decreases, in particular as a result of thermal aging and/or the chemical positioning unavoidably caused by certain components of the lubricants and/or fuels used to operate the internal combustion engine. The quantity of nitrogen dioxide produced by catalytic conversion decreases to a corresponding extent.

For this reason, the catalyst element is usually configured in such a way that it allows a conversion rate to be achieved which is greater than or equal to a certain minimum conversion rate over its entire planned service life. This means, however, that, at the beginning of the service life of the catalyst element and in particular immediately upon the startup of the driving system, the conversion rate is higher than is necessary to produce the desired quantity of nitrogen dioxide. To a corresponding extent, the quantity of nitrogen dioxide present in the exhaust gas downstream of the catalyst element is too large; under certain circumstances, no use can be made of this surplus downstream from the catalyst element, and to this extent it is discharged to the external environment of the driving system. The result is that the nitrogen dioxide emissions of the driving system are higher than need be.

SUMMARY OF THE INVENTION

It is therefore the goal of the invention to propose a method for operating a driving system which at least partially avoids the disadvantage described above and which in particular makes it possible to decrease the nitrogen dioxide emission of the driving system to a very low level over the entire service life of the catalyst element.

This is achieved according to the invention by a method in which to compensate for the aging-related decrease in the conversion rate of the catalyst element, the nitrogen monoxide emission of the internal combustion engine and/or the exhaust gas temperature upstream from the catalyst element is adjusted as a function of the instantaneous conversion rate and/or the age of the catalyst in such a way that the nitrogen dioxide concentration downstream from the catalyst element is greater than or equal to a minimum concentration and/or that the molar ratio between nitrogen monoxide and nitrogen dioxide downstream from the catalyst element corresponds to a predetermined ratio. In the former case, i.e., the case in which the nitrogen dioxide concentration is intended to correspond to at least the minimum concentration, influence is therefore exerted on the absolute quantity of nitrogen dioxide present in the exhaust gas downstream from the catalyst element. The alternative or additional adjustment of the molar ratio between nitrogen monoxide and nitrogen dioxide to the predetermined ratio, in contrast, serves to adjust the quantity of the nitrogen dioxide in the exhaust gas relative to the quantity of the nitrogen monoxide. Obviously, a combination of the two embodiments can be provided, in which both the nitrogen dioxide concentration is to be greater than or equal to the minimum concentration and the molar ratio is to be equal to the predetermined ratio.

To adjust the previously mentioned parameters, the nitrogen monoxide emission of the internal combustion engine and/or the exhaust gas temperature upstream from the catalyst element is adjusted as appropriate. By adapting the nitrogen monoxide emission of the internal combustion engine, the concentration of nitrogen monoxide in the exhaust gas stream upstream from the catalyst is increased. The quantity of nitrogen dioxide produced from the nitrogen monoxide with the help of the catalyst element increases to a corresponding extent, even if the instantaneous conversion rate is lower than the starting conversion rate, i.e., the rate at which the catalyst element operates at the beginning of its service life, i.e., when it is new.

The instantaneous conversion rate depends largely on the exhaust gas temperature upstream from the catalyst element or during the passage of the exhaust gas over the catalyst element. To a corresponding extent, the molar ratio, in particular the predetermined ratio, between nitrogen monoxide and nitrogen dioxide downstream from the catalyst can be adjusted by changing the exhaust gas temperature. The conversion rate describes preferably the quantity of nitrogen dioxide which can be generated per unit time from nitrogen monoxide in proportion to the amount of nitrogen monoxide present at the time.

The nitrogen monoxide emission of the internal combustion engine and/or the exhaust gas temperature upstream from the catalyst element is preferably selected as a function of the instantaneous conversion rate of the catalyst element and/or of the age of the catalyst element. Then the internal combustion engine is adjusted in such a way that the nitrogen monoxide emission and/or exhaust gas temperature is realized. By means of a procedure such as this, the age-related decrease in the conversion rate of the catalyst element can be compensated. As previously explained, a certain absolute quantity of nitrogen dioxide or a certain absolute nitrogen dioxide concentration can be achieved downstream from the catalyst element. Alternatively or in addition, as also previously discussed, it is also possible to exert an influence on the quantity of nitrogen dioxide or on the nitrogen dioxide concentration relative to the quantity of nitrogen monoxide or the nitrogen monoxide concentration downstream from the catalyst. It is especially preferable for the molar ratio between nitrogen monoxide and nitrogen dioxide to be adjusted to the predetermined value. For example, a ratio of 1 can be selected as the predetermined ratio.

The catalyst element is, for example, a component of an oxidation catalyst, especially of a diesel oxidation catalyst (DOC) of the exhaust gas purifying device. Alternatively, the catalyst element can, of course, be provided as a separate component in the exhaust gas purifying device.

In a preferred embodiment of the invention, it is provided that, to compensate for the age-related decrease in the conversion rate, the nitrogen monoxide emission is increased at a certain operating point of the internal combustion engine over the service life of the catalyst element. As previously explained, the instantaneous conversion rate of the catalyst element decreases with increasing age of the catalyst element over its service life. To a corresponding extent, it is necessary, in order to ensure a certain nitrogen dioxide concentration downstream from the catalyst element, to increase the nitrogen monoxide concentration upstream from the catalyst element. By means of this higher nitrogen monoxide concentration, the nitrogen dioxide concentration downstream from the catalyst element can be kept the range of the minimum concentration even though the conversion rate is lower at the same time. In particular, the nitrogen dioxide concentration will be greater than or equal to the minimum concentration.

It is obvious that different nitrogen monoxide emissions and/or different exhaust gas temperatures will be present at different operating points of the internal combustion engine; therefore, so that it is possible to compare two nitrogen dioxide concentrations at different times over the service life of the catalyst element, the same operating point must selected. The operating point is characterized by, for example, the rpm's of the internal combustion engine and/or the torque generated by it. In addition or alternatively, at least one other operating parameter can be used to characterize the operating point.

When the conversion rates of the catalyst element at different times are compared with each other, the conversion rate at the later time will be lower than the conversion rate at the earlier time. Correspondingly, at an otherwise identical operating point, the nitrogen monoxide emission must be larger at the later time to achieve a nitrogen dioxide concentration downstream from the catalyst element which—is the same or higher than that present at the earlier time. To compensate for the age-related decrease in the conversion rate, it is obviously preferable to increase the nitrogen monoxide emission at all operating points of the internal combustion engine over the service life of the catalyst element. The increase therefore occurs not only at a single operating point but rather at all possible operating points. The increase can be different, however, for different operating points.

According to an elaboration of the invention, the adjustment of the nitrogen monoxide emission and/or of the exhaust gas temperature is accomplished by changing at least one operating parameter of the internal combustion engine, in particular by changing the injection parameter, the charging pressure of a charger, the exhaust gas return rate, and/or an actuation parameter of at least one intake valve and/or of at least one exhaust valve. The nitrogen monoxide emission of the internal combustion engine or the exhaust gas temperature can be influenced by numerous operating parameters of the internal combustion engine. These operating parameters include, for example, the injection parameters, the charging pressure, the exhaust gas return rate, and/or the actuation parameters of the intake valve or exhaust valve.

The injection parameter, for example, is the quantity of fuel supplied to the internal combustion engine per unit time and/or the time over the course of which the fuel is supplied. The latter is defined by the start of injection, the duration of injection, and/or the end of injection. The charging pressure of the charger corresponds to the pressure downstream from the charger or the pressure of the fresh charge, in particular fresh air, supplied to the engine. The charger is a turbocharger, for example, especially an exhaust gas turbocharger, or a compressor. The exhaust gas return rate is the quantity of exhaust gas which is sent back again to the engine per unit time. The actuation parameter of the intake valve or of the exhaust valve is, for example, the opening time, the closing time, and/or the duration of the open time during which the valve in question is at least partially open. The actuation parameter of the intake valve or of the exhaust valve corresponds to the control times of the valve in question, i.e., to the opening time, to the duration of the open time, and/or to the closing time.

At least one of the previously mentioned operating parameters, preferably, however, several operating parameters, are now adjusted to achieve the desired nitrogen monoxide emission or the desired exhaust gas temperature, wherein this can be carried out under open-loop or closed-loop control, in particular as a function of the nitrogen dioxide concentration downstream from the catalyst element or as a function of the molar ratio.

According to another embodiment of the invention, the minimum concentration is selected in such a way that a particle filter of the exhaust gas purifying device is regenerated continuously by means of nitrogen dioxide at a determined regeneration rate. The exhaust gas purifying device therefore comprises the particle filter. In this case, the internal combustion engine is configured as a diesel engine, for example. The particle filter serves to filter the particles present in the exhaust gas of the internal combustion engine, especially the soot particles or carbon particles, out of the exhaust gas. It is especially preferable for the particle filter to be configured as a "continuously regenerating trap" (CRT). The particle filter is now arranged downstream from the catalyst element, so the exhaust gas of the internal combustion engine flows through it only after it has passed through the catalyst element. The nitrogen dioxide present in the exhaust gas at this point, which is produced essentially by the catalyst element from nitrogen monoxide, serves now to regenerate the particle filter continuously at the determined regeneration rate. The regeneration rate in the case of the particle filter can also be called the "soot burnoff rate". Regeneration is provided, or at least possible, over wide ranges of the characteristic map of the engine.

The regeneration rate is preferably selected in such a way that a reliable filtering of the exhaust gas by the particle filter is always possible over the entire power range of the internal combustion engine. Expressed differently, the regeneration rate should be selected so that the regeneration of the particle filter is always sufficient to ensure that the particle filter functions reliably. The regeneration rate or soot burnoff rate is therefore selected in such a way, for example, that the particle filter is not blocked or plugged by the particles, especially by the soot particles, even when the engine is operating permanently at full load. Especially when the particles are present in the form of soot particles, they can be converted by the nitrogen dioxide present in the exhaust gas to carbon dioxide and nitrogen monoxide. To achieve the determined regeneration rate or soot burnoff rate, it is therefore necessary for a certain nitrogen dioxide concentration to be present. In particular, the above-described minimum concentration is determined as a function of the regeneration rate, preferably, therefore, in such a way that the particle filter is reliably regenerated even under permanent full-load conditions of the engine.

According to another embodiment of the invention, a catalyst of the exhaust gas purifying device arranged downstream from the catalyst element is configured as, or is, an SCR catalyst. For example, the exhaust gas purifying device comprises the catalyst downstream from the catalyst element. The catalyst serves to carry out a selective catalytic reduction of pollutants present in the exhaust gas, in particular nitrogen oxides, i.e., in particular nitrogen monoxide and/or nitrogen dioxide. It is especially advantageous for a reducing agent to be introduced into the exhaust gas upstream from the catalyst; this reducing agent can be in the form of, for example, ammonia or an aqueous urea solution, from which ammonia is formed in the exhaust gas. This reducing agent arrives together with the exhaust gas in the catalyst and serves there to carry out the reduction of the nitrogen oxides.

The reactions which take place here can described by, for example, the following reaction equations:

$$4NO_2 + 4NH_3 + O_2 \rightarrow 4N_2 + 6H_2O \quad \text{(Equation 1)}$$

$$6NO_2 + 8NH_3 \rightarrow 7N_2 + 12H_2O \quad \text{(Equation 2)}$$

$$NO_2 + NO + 2NH_3 \rightarrow 2N_2 + 3H_2O \quad \text{(Equation 3)}$$

Equation 3 describes here an especially efficient reaction route, in which the nitrogen dioxide reacts directly with the nitrogen monoxide. To allow this reaction route to proceed in preference to the others, it is necessary for the exhaust gas to contain the nitrogen monoxide and nitrogen dioxide in equal amounts. Correspondingly, a molar ratio of 1 is selected. Thus, by approximation, preferably one nitrogen dioxide molecule is available to react with every nitrogen monoxide molecule. Expressed differently, the predetermined ratio is therefore selected in such a way that at least the reaction route of the selective catalytic reaction of the exhaust gas according to Equation 3, in which nitrogen monoxide reacts with nitrogen dioxide under participation of a reducing agent introduced into the exhaust gas, proceeds at all times or at least over the widest possible temperature range in the catalyst of the exhaust gas purifying device.

According to an especially advantageous embodiment of the invention, the adjustment is carried out in such a way that the nitrogen dioxide concentration downstream from the catalyst element is less than or equal to a maximum concentration. This therefore ensures that the nitrogen dioxide concentration is greater than or equal to the previously described minimum concentration, which is relevant in particular to the regeneration of the particle filter. At the same time, however, the maximum concentration is also to be taken into account. This is important, because excess nitrogen dioxide present downstream from the catalyst element cannot be used and accordingly can escape to the outside environment of the driving system. In addition, when there is an oversupply of nitrogen dioxide, $N_2O$ will form on the previously mentioned SCR catalyst. This, however, is undesirable. A surplus of nitrogen dioxide should therefore be avoided, especially so that the emission limits for nitrogen dioxide can be met.

In the ideal case, the nitrogen dioxide concentration downstream from the catalyst element is adjusted or regulated precisely to a predetermined value. In this case, the maximum concentration corresponds to the minimum concentration, so that the nitrogen dioxide concentration present downstream from the catalyst element is both equal to the minimum concentration and equal to the maximum concentration. Because this is technically difficult to achieve, however, a certain latitude is specified, within which a value can be selected for the maximum concentration which is greater than the minimum concentration. For example, the minimum concentration can be below an ideal value of the nitrogen dioxide concentration by a predetermined difference, and the maximum concentration can be above the ideal nitrogen dioxide concentration by this same difference.

According to an elaboration of the invention, a first nitrogen oxide concentration value is determined by means of a first nitrogen oxide sensor upstream from the catalyst element, and a second nitrogen oxide concentration value is determined by a second nitrogen oxide sensor downstream from the catalyst element, wherein the nitrogen dioxide concentration is obtained from the difference between the first nitrogen oxide concentration value and the second nitrogen oxide concentration value. The first and second nitrogen oxide sensors are configured in such a way that they detect all nitrogen oxides, i.e., specifically both nitrogen monoxide and nitrogen dioxide, and they provide the concentrations as the first and second nitrogen oxide concentration values. Because the quantity of nitrogen dioxide formed by the internal combustion engine is negligible, however, it is possible, from the difference between the two nitrogen oxide concentration values, to arrive directly at the nitrogen dioxide concentration converted from nitrogen monoxide by the catalyst element, i.e. the nitrogen dioxide concentration which is therefore present in the exhaust gas downstream from the catalyst element.

The first nitrogen oxide sensor and the second nitrogen oxide sensor are preferably nitrogen monoxide sensors, but they comprise a cross-sensitivity for nitrogen dioxide. The nitrogen oxide sensors therefore respond both to nitrogen monoxide and to nitrogen dioxide. The measuring method of the nitrogen oxide sensors can be for example, an IR measuring method, a chemiluminescence measuring method, and/or an electrochemical measuring method. On the basis of the nitrogen dioxide concentration thus determined, the nitrogen dioxide concentration can be regulated to a predetermined concentration which is greater than or equal to the minimum concentration or corresponds to it.

According to another advantageous embodiment of the invention, the first nitrogen oxide sensor and the second nitrogen oxide sensor are calibrated at an exhaust gas temperature at which the conversion rate is lower than a determined conversion rate. Because the nitrogen oxide sensors, like the catalyst element, are subject to aging, it is necessary to carry out the calibration at regular time intervals, for example. The exhaust gas temperature upstream from the catalyst element should be selected in such a way that the conversion rate—which is dependent directly on the exhaust gas temperature—is low, e.g., less than 10%, especially less than 5%, smaller than 2.5%, smaller than 1%, or smaller than 0.5%; the determined conversion rate therefore corresponds to one of the values cited above. In this case, as the nitrogen monoxide flows over the catalyst element, only a small amount of nitrogen dioxide is formed. Of course, the determined conversion rate can be much lower than the values cited above, preferably a value of 0.25%, 0.1%, or even 0.05%.

In a corresponding manner, the nitrogen oxide sensors can be calibrated in such a way that the first nitrogen oxide concentration value is set equal to the second nitrogen oxide concentration value or vice versa. This makes it possible to compensate for the aging of the sensors and/or for the manufacturing tolerances of the sensors. To avoid error, the conversion rate must be lower than the determined conversion rate during the entire calibration process. In a corresponding manner, the exhaust gas temperature must also be selected appropriately during the entire calibration process; it is preferably lower than a predetermined exhaust gas temperature for which the previously mentioned condition is fulfilled. Alternatively, the exhaust gas temperature can be higher than the predetermined exhaust gas temperature, because the conversion rate also decreases at high exhaust gas temperatures. It is especially preferable for the exhaust gas temperature to be kept constant throughout the calibration process.

Finally, it can be provided that the second nitrogen oxide sensor is arranged downstream from the catalyst and/or from the particle filter and that the second nitrogen oxide concentration value is obtained from a measurement value of the second nitrogen oxide sensor and a correction value, which takes into account the catalyst and/or the particle filter. Preferably, of course, the second nitrogen oxide sensor will be provided immediately downstream from the catalyst element, i.e., at least, therefore, upstream from the catalyst and/or the particle filter. This is not possible in all cases, however. Thus the second nitrogen oxide sensor can be, when necessary, arranged downstream from the catalyst and/or the particle filter and can acquire the measurement value at this point.

This already means, however, that the exhaust gas no longer has the nitrogen dioxide concentration present directly downstream from the catalyst element, because nitrogen dioxide has already been consumed in the catalyst or particle filter. For this reason, the correction value must be taken into account when deriving the second nitrogen oxide concentration value from the measurement value. The correction value describes, for example, the quantity of nitrogen dioxide in the exhaust gas which has been consumed by the catalyst and/or the particle filter. For example, the correction value is acquired by means of a mathematical relationship, a table, and/or a characteristic diagram. The correction value is dependent in particular on the temperature of the exhaust gas.

The invention also pertains to a driving system, especially for implementing the method according to explanations given above, with an internal combustion engine and an exhaust gas purifying device, through which exhaust gas of the engine flows to be purified, wherein the exhaust gas purifying device comprises at least one catalyst element for the catalytic conversion of nitrogen monoxide and nitrogen dioxide at a determined conversion rate. It is provided that, to compensate for the age-related decrease in the conversion rate of the catalyst element, the driving system is configured to adjust the nitrogen monoxide emission of the internal combustion engine and/or the exhaust gas temperature upstream from the catalyst element as a function of the instantaneous conversion rate and/or of the age of the catalyst in such a way that the nitrogen dioxide concentration downstream from the catalyst element is greater than or equal to a minimum concentration and/or that the molar ratio between nitrogen monoxide and nitrogen dioxide downstream from the catalyst corresponds to a predetermined ratio. The advantages of an embodiment of the driving system and of a method such as this have already been discussed. The driving system and the corresponding method can be elaborated as explained above, so that, to this extent, reference can be made to that discussion.

The invention is explained in greater detail below on the basis of the exemplary embodiments shown in the drawings, but the invention is not be considered limited in any way by these examples.

DETAILED DESCRIPTION OF THE INVENTION

Figure 1:
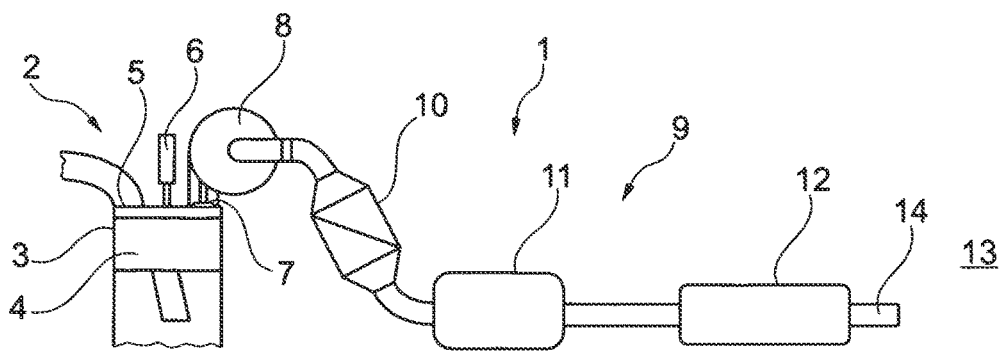
FIG. 1 shows a schematic diagram of a driving system with an internal combustion engine and an exhaust gas purifying device.

FIG. 1 shows a schematic diagram of a driving system 1, which comprises an internal combustion engine 2, of which here only one cylinder 3 with a piston 4 is shown. Through an intake valve 5, a fresh charge, i.e., fresh air or a fresh air-fuel mixture, for example, can be supplied to the cylinder 3. In the exemplary embodiment shown here, furthermore, an injection valve 6 is provided, which serves to introduce fuel into the cylinder 3, i.e., the combustion chamber of the cylinder 3. Finally, at least one exhaust valve 7 is assigned to the cylinder 3; exhaust gas from the cylinder 3, i.e., from the combustion chamber, is discharged through this valve and flows by way of an exhaust gas manifold 8 to an exhaust gas purifying device 9.

The exhaust gas purifying device 9 has, for example, an oxidation catalyst 10 or diesel oxidation catalyst (DOC), a particle filter 11, and a catalyst 12 for selective catalytic reduction (SCR catalyst). The exhaust gas of the internal combustion engine 2 flows through the oxidation catalyst 10, the particle filter 11, and the catalyst 12 in that order. Downstream from the catalyst 12, the gas is discharged into the outside environment 13 of the driving system 1, in particular through a tailpipe 14. In the oxidation catalyst 10, a catalyst element (not shown in detail) is provided, which is configured in the form of, for example, a coating, especially a noble-metal coating, in the oxidation catalyst 10. Platinum or a platinum alloy, for example, can be used as the noble metal. This catalyst element serves to convert nitrogen monoxide present in the exhaust gas into nitrogen dioxide at a determined conversion rate. The nitrogen dioxide serves then, i.e., downstream from the oxidation catalyst 10, to realize a continuous regeneration of the particle filter 11 at a determined regeneration rate and/or to support a rapid reaction in the catalyst 12 leading to the decomposition of the nitrogen monoxide present in the exhaust gas.

In the particle filter 11, particles, especially carbon particles, are decomposed [Sic→converted?—JPD] to carbon dioxide and nitrogen monoxide according to the reaction equation:

$$2NO_2 + C \rightarrow CO_2 + 2NO.$$

Thus the particle filter is always available to take up additional particles brought in by the exhaust gas. In the catalyst 12, however, the reaction route proceeds according to the reaction equation:

$$NO_2 + NO + 2NH_3 \rightarrow 2N_2 + 3H_2O,$$

wherein the ammonia ($NH_3$) is preferably introduced into the exhaust gas upstream from the catalyst 12. This introduction is achieved in the form of urea, which reacts with the water present in the exhaust gas to form ammonia and carbon dioxide according to the reaction equation:

$$(NH_2)_2CO + H_2O \rightarrow 2NH_3 + 2CO_2.$$

Because the catalyst element is subject to an aging process, however, so that the achievable conversion rate decreases with increasing age of the catalyst element, the above-cited reactions cannot continue to the required extent without further measures. It is known, for example, that the catalyst element can be configured in such a way that, over the entire service life of the element, the nitrogen dioxide concentration present downstream from the catalyst element is greater than or equal to a minimum concentration and/or that the molar ratio between nitrogen monoxide and nitrogen dioxide downstream from the catalyst element corresponds to a predetermined ratio. This means, however, that, at the beginning of the service life of the catalyst element, the nitrogen dioxide concentration present downstream from the catalyst element can be too high. Such a high nitrogen dioxide concentration leads to the formation of nitrous oxide ($N_2O$) in the catalyst 12, or—especially if the catalyst 12 is not present—to the discharge of nitrogen dioxide into the outside environment 13. This, however, is undesirable.

For this reason, to compensate for the age-related decrease in the conversion rate of the catalyst element, the nitrogen monoxide emission of the internal combustion engine 2 and/or the exhaust gas temperature upstream of the catalyst element are to be adjusted as a function of the instantaneous conversion rate and/or of the age of the catalyst element in such a way that the nitrogen dioxide concentration downstream from the catalyst element is greater than or equal to the minimum concentration and/or that the molar ratio between nitrogen monoxide and nitrogen dioxide downstream from the catalyst element corresponds to a predetermined value. It is provided, for example, that the nitrogen dioxide concentration is measured, and that the nitrogen monoxide emission of the engine and/or the exhaust gas temperature is adjusted in either open-loop or closed-loop fashion on the basis of this measured nitrogen dioxide concentration in such a way, as a function of a measurement value acquired by a nitrogen oxide sensor, that the nitrogen dioxide concentration reaches the desired minimum concentration.

Figure 2:
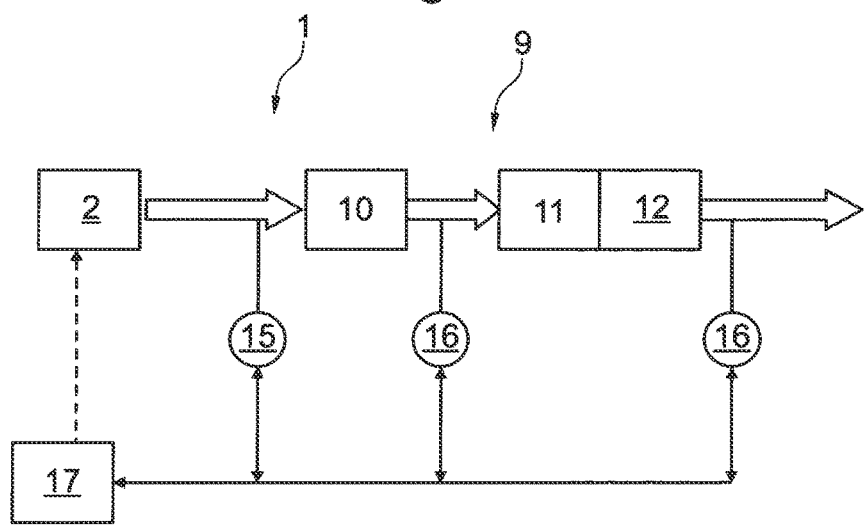
FIG. 2 shows a schematic diagram of the exhaust gas purifying device.

FIG. 2 shows another schematic diagram of the driving system 1 with internal combustion engine 2 and exhaust gas purifying device 9, wherein the latter comprises at least the oxidation catalyst 10 and the particle filter 11 and/or the catalyst 12. Upstream from the oxidation catalyst 10, in which the catalyst element is present, a first nitrogen oxide sensor 15 is provided, by means of which a first nitrogen oxide concentration value is determined. A second nitrogen oxide sensor 16 is arranged either just downstream from the oxidation catalyst 10 or, in terms of the flow, between the oxidation catalyst on one side and the particle filter 11/catalyst 12 on the other side or downstream from the particle filter 11/catalyst 12, wherein this sensor serves to determine a second nitrogen oxide concentration value.

If the second nitrogen oxide sensor 16 is arranged upstream from the particle filter 11 and the catalyst 12, an instantaneous nitrogen dioxide concentration can be obtained directly from the difference between the first nitrogen oxide concentration value and the second nitrogen oxide concentration value, because normally the amount of nitrogen dioxide produced directly by the internal combustion engine 2 is negligible. If, however, the second nitrogen oxide sensor 16 is provided downstream from the particle filter 11 and/or the catalyst 12, then the second nitrogen oxide concentration value is obtained from the measurement value of the second nitrogen oxide sensor 16 and a correction value, wherein this correction value takes into account the particle filter 11 or the catalyst 12. For example, it is preferable for the first nitrogen oxide concentration value and the second nitrogen oxide concentration value to be sent to a control unit 17 of the driving system 1, which serves to manage the internal combustion engine 2 in the manner described above.

Figure 3:
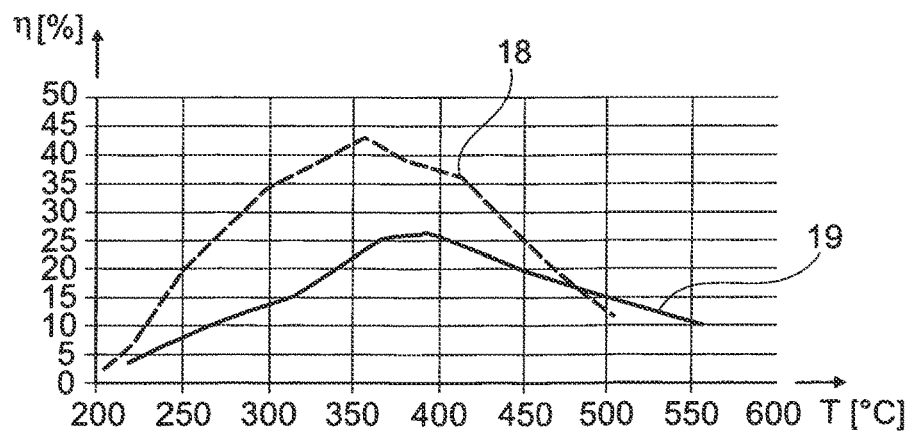
FIG. 3 shows a diagram in which the conversion rates of a catalyst element of the exhaust gas purifying device are plotted versus the temperature of the exhaust gas of the internal combustion engine.

FIG. 3 is a graph, in which a first curve 18 shows the conversion rate η plotted versus the temperature T of the exhaust gas directly upstream from the catalyst element at the beginning of its service life. The curve 19 shows, in contrast, the conversion rate η versus the temperature T for a catalyst element which has already undergone aging. The graph thus clearly shows that, as the catalyst element ages, not only the conversion rate η decreases, but also the temperature T at which a maximum conversion rate is present also shifts. This can be used in particular for the purpose of adjusting the exhaust gas temperature upstream from the catalyst element in such a way that the molar ratio between nitrogen monoxide and nitrogen dioxide downstream from the catalyst element corresponds to the predetermined ratio, even if the conversion rate η of the already aged catalyst element is less than the conversion rate of a new catalyst element.

The invention claimed is:

1. A method for operating a driving system, with an internal combustion engine and an exhaust gas purifying device, through which exhaust gas of the internal combustion engine flows to be purified, the exhaust gas purifying device comprises at least one catalyst element for a catalytic conversion of nitrogen monoxide to nitrogen dioxide at a determined conversion rate, the method comprising: compensating for an age-related decrease in the conversion rate of the catalyst element by adjusting nitrogen monoxide emission of the internal combustion engine and exhaust gas temperature upstream from the catalyst element as a function of an instantaneous conversion rate and/or age of the catalyst so that a nitrogen dioxide concentration downstream from the catalyst element is greater than or equal to a minimum concentration and that a molar ratio between nitrogen monoxide and nitrogen dioxide downstream from the catalyst element corresponds to a predetermined ratio.

2. The method according to claim 1, including, to compensate for the age-related decrease in the conversion rate, increasing the nitrogen monoxide emission at a determined operating point of the internal combustion engine over a service life of the catalyst element.

3. The method according to claim 1, wherein the adjustment of the nitrogen monoxide emission and/or of the exhaust gas temperature is accomplished by changing at least one operating parameter of the internal combustion engine, a charging pressure of a charger, an exhaust gas return rate, and/or an actuation parameter of at least one intake valve and/or at least one exhaust valve.

4. The method according to claim 3, wherein the operating parameter of the internal combustion engine is an injection parameter.

5. The method according to claim 1, including selecting the minimum concentration so that a particle filter of the exhaust gas purifying device is regenerated continuously by nitrogen dioxide at a determined regeneration rate.

6. The method according to claim 1, wherein a catalyst of the exhaust gas purifying device arranged downstream from the catalyst element is an SCR catalyst.

7. The method according to claim 1, wherein the adjustment is carried out so that the nitrogen dioxide concentration downstream from the catalyst element is less than or equal to a maximum concentration.

8. The method according to claim 1, wherein a first nitrogen oxide concentration value is acquired by a first nitrogen oxide sensor upstream from the catalyst element, and a second nitrogen oxide concentration value is determined by a second nitrogen oxide sensor downstream from the catalyst element, wherein the nitrogen dioxide concentration is determined from a difference between the first nitrogen oxide concentration value and the second nitrogen oxide concentration value.

9. The method according to claim 8, wherein a calibration of the first nitrogen oxide sensor and of the second nitrogen oxide sensor is carried out at an exhaust gas temperature for which the conversion rate is lower than a determined conversion rate.

10. The method according to claim 8, wherein the second nitrogen oxide sensor is arranged downstream from the catalyst and/or from a particle filter of the exhaust gas purifying device, and the second nitrogen oxide concentration value is determined from a measurement value of the second nitrogen oxide sensor and a correction value which takes into account the catalyst and/or the particle filter.

11. A driving system, comprising: an internal combustion engine; and an exhaust gas purifying device through which exhaust gas of the internal combustion engine flows to be purified, wherein the exhaust gas purifying device comprises at least one catalyst element for a catalytic conversion of nitrogen monoxide to nitrogen dioxide at a conversion rate, wherein to compensate for an age-related decrease in the conversion rate of the catalyst element, the driving system is configured to adjust nitrogen monoxide emission of the internal combustion engine and exhaust gas temperature upstream from the catalyst element as a function of an instantaneous conversion rate and/or of age of the catalyst element so that a nitrogen dioxide concentration, downstream from the catalyst element is greater than or equal to a minimum concentration and that a molar ratio between nitrogen monoxide and nitrogen dioxide downstream from the catalyst element corresponds to a predetermined ratio.

* * * * *